3,189,468
PROCESS FOR PRESERVING FRUITS AND VEGETABLES AND PRESERVATIVE COATING THEREFOR
Arthur F. Kalmar, Riverside, Calif., assignor to FMC Corporation, San Jose, Calif., a corporation of Delaware
No Drawing. Filed Oct. 10, 1963, Ser. No. 315,376
4 Claims. (Cl. 99—168)

The present application is a continuation-in-part of my prior copending application, Serial No. 859,138, entitled Process of Preserving Produce and Preservative Coating and filed December 14, 1959.

The present invention pertains to a process of preserving produce and a preservative coating and more particularly to the preservation of fruit and vegetables by intimate and protracted contact thereof with a fungicide.

It has been known to employ fungicides with a high vapor pressure for the preservation of fruit. These fungicides have usually been applied to the fruit packaging material, such as for example the tissue wraps, paper liners, or the cardboard cartons ordinarily used. The fungicide on the packaging material vaporizes, creating a fungicidal atmosphere around the fruit which hinders mold growth.

As disclosed in my cited copending application, when the fungicide is applied only to the adjacent packaging material, its effectiveness is limited since it does not come into direct and intimate contact with the fruit surfaces, and with cuts, punctures and mold spores on the fruit.

As also disclosed in my prior application, if a high vapor pressure fungicide is applied by itself to the surface of the fruit, it rapidly vaporizes and dissipates into the surrounding atmosphere so as to provide little control of mold growth during the normal market life of the fruit. The invention disclosed in said prior application overcomes the problem of rapid dissipation by applying the fungicide in a solution which also contains a resinous carrier for the fungicide. The carrier envelopes the fruit and slowly releases the fungicidal vapor directly to the fruit surface, cuts, punctures, and mold spores so that undesirable decay is prevented during the normal marketing period for the fruit.

The coating disclosed in my earlier application has the further and significant advantage that it contains no emulsifier which, it has been discovered, coats molds spores and precludes contact of the fungicide therewith.

The process and coating of the present invention are further developments of the process and coating disclosed in my above identified application and offer even more advantages, as will be subsequently explained. Whereas my prior application discloses the use of the fungicides diphenyl and orthophenylphenol, the process and coating of the subject invention employs the fungicide dibromotetrachloroethane (1,2 - dibromo - 1,1,2,2, tetrachloroethane), hereinafter referred to as DBTCE.

It is an object of the present invention to preserve produce by the intimate and protracted contact thereof with a vaporizable fungicide.

Another object is to provide a process for applying a fungicide with a high vapor pressure so that the fungicide is slowly released into direct contact with the fruit surface and cuts, punctures, and mold spores on the fruit.

Another object is to provide a process for applying a fungicide with a high vapor pressure so that the fungicide can come into direct contact with mold spores and is not inhibited by barriers such as caused by an emulsifier.

Another object is to provide a process for directly applying the fungicide DBTCE to fruit and vegetables and controllably releasing such fungicide thereon.

Another object is to provide a fungicidal coating that can be applied to fruits and vegetables and thereafter controllably released into direct contact with the surfaces of the fruits and vegetables, and cuts, punctures, mold spores, and the like, on the produce.

Another object is to provide a fungicidal coating that has no ingredient which forms a barrier to the contact of a fungicide with the mold spores and the like.

Another object is to provide a fungicidal coating containing DBTCE.

Another object is to provide a fungicidal coating which is capable of retarding the growth of certain strains of mold which resist the toxic action of other fungicides.

Another object is to prevent stickiness in fungicidal coating for fruits and vegetables.

Another object is to enable more fungicide to be used in a fungicidal coating for preserving produce than heretofore thought possible.

These objects, together with other objects and advantages, will become apparent from the following description.

In accordance with the present invention, a fungicidal agent, namely DBTCE, is incorporated along with a waxy material in a volatile organic solvent, and the solution is applied to the surface of perishable products, such as fruits and vegetables. Although various means for applying the solution to the perishable products may be employed, the solution is preferably applied as a fine spray in the manner disclosed in the Sharma U.S. Patent No. 2,212,621 and Sells et al. U.S. Patent No. 2,342,063.

As a result of its application directly to the surface of the fruit or vegetable, the fungicide acts in several ways. Firstly, there is direct contact with the mold spores on the surface. Secondly, the fungicide vaporizes and diffuses into the cuts and punctures in the surface and into other areas where there may not have been direct contact. There is also evidence that the fungicide diffuses through the waxy cutin of citrus fruit and into the peel tissue thereby providing further protection against mold growth. Since the fungicide is incorporated in a solution, and no emulsifier is present, the fungicide intimately contacts the mold spores.

The waxy material present in the solution along with the fungicide provides conditions of fungicidal action not possible when the fungicide is employed alone. The waxy material appears to regulate the amount of DBTCE which comes into intimate contact with the fruit surface at any one time. In solutions containing DBTCE, the combination of the waxy film-forming material therewith has been found to result in considerably better mold control than when DBTCE is used alone in a solution. That is, the waxy material appears to controllably release the DBTCE so that the latter slowly diffuses from the waxy film at a rate so as to produce a fungistatic "skin" of DBTCE vapor around the fruit, the presence of which "skin" may last for a considerable time and thus increase the normal market life of the fruit. DBTCE has a high vapor pressure and will not persist on the surface of the fruit if it is deposited by itself from a solvent solution. Accordingly, the use of a waxy material in a solvent solution provides, for the first time, a medium by which the DBTCE can be effectively applied to fruits and vegetables.

The solution here preferably has a concentration of between about ½% to about 10% by weight of DBTCE. Furthermore, the waxy film forming material should be present in the solution in an amount from about 1% to about 20% by weight.

The factors which govern the concentration of fungicide in the particular waxy material solution are: its solubility in the solvent; the phytotoxicity of the fungicide; the residue of fungicide on the fruit permitted by government regulation; the effect of the fungicide on the appearance, taste, and aroma of the fruit; and the economic factors involved. Approximately 50 p.p.m. of fungicide, based on the whole fruit weight, should usually be applied for a minimum degree of mold control.

The volatile organic solvent employed for the solution of fungicide and waxy film former is preferably a petroleum distillate. Other volatile solvents may be employed, such as ethyl and isopropyl alcohol. The characteristic of the solvent employed is that it should be sufficiently volatile to evaporate readily during the process. For example, in treating citrus fruit by the subject process, petroleum solvents having boiling points respectively in the ranges of 210° F. to 280° F., 150° F. to 230° F., and 180° F. to 380° F., have been employed. Generally, at least about 90% of the solvent should have a boiling point below 300° F.

The waxy material should be completely dissolved in the solvent. The amount of waxy material which can be held in solution varies with the temperature of the solution, and insofar as the present invention is concerned, it is preferable to use about 10% by weight, or more, of waxy material in solution. Representative waxy film formers which are suitable for the practice of the present invention are the coumaroneindene resins, polyindene resins, hydrocarbon terpene resins, phenolic resins, alkyd resins, polyamide resins, rosin and modified rosins, paraffin wax, spermacetic wax and shellac; whenever the general expression "waxy carrier" or "waxy material" is used herein, it is intended to refer to the foregoing materials or a selected one thereof, or to any material which is equivalent to the foregoing materials for the purpose of the present invention.

The following examples illustrate the practice of the invention:

Example I

A solution of resin and fungicide was prepared by dissolving 10% by weight of the resin known commercially as Nevindene R-1 (Handbook of Material Trade Names, by Zimmerman and Lavine, 1953 edition, page 391, table at bottom) and 4% by weight DBTCE in 86% by weight of the petroleum solvent known commercially as Shell VM & P Naphtha (the Merck Index, sixth edition, page 573, under "Ligroin"). This solution was applied to lemons by a spraying process such as disclosed in the aforementioned Sharma and Sells patent. Spray nozzles known commercially as number 4.00 Monarch nozzles operating at 40 pounds pressure were employed. The conveyor speed was 126 valleys per minute and approximately 140 parts per million were applied on each lemon; that is, for each lemon of approximately 100 grams weight, approximately 0.014 gram of solid coating of resin and DBTCE was applied.

Example II

A resin-fungicide solution was prepared by dissolving 10% by weight of shellac and 4% by weight of DBTCE in 86% by weight isopropyl alcohol. This solution was applied to apples under the conditions set forth in Example I, above.

Example III

A solution of resin and fungicide was prepared by dissolving 12% by weight of the modified rosin known commercially as Limed Poly-pale and 3% by weight DBTCE in 85% by weight of the petroleum solvent known commercially as Shell VM & P Naphtha. This solution was applied to oranges under the conditions set forth in Example I. Limed Poly-pale is formed by reacting a polypale resin with lime. "Poly-pale" is a registered trademark. As is known, rosin is composed largely of unsaturated isomeric resin acids such as primaric and abietic acids. The process used for preparing Poly-pale resin causes a portion of these unsaturated resin acids to react with each other through their double bonds to form polymers. The concentration of the polymers, as in Poly-pale resin, is approximately 40%, with the remaining portion being the normal constituents of rosins. To make the Limed Poly-pale resin, the Poly-pale resin is reacted with hydrated lime under controlled temperature condition.

The following table sets forth the results of a test illustrating the effectiveness of a process and coating as described in Example I. Fresh lemons were artificially injured and inoculated with spores of *Penicillum digitatum*. The fruit was then treated as described in Example I. After storage at 57° F. for 10 days and at 72° F. for 7 days, the fruit was examined for mold with the following results.

| Treatment: | Percent decay after 17 days |
|---|---|
| 10% by wt. Nevindene resin in Shell VM & P Naphtha | 96.5 |
| 10% by wt. Nevindene resin plus 4% by DBTCE in Shell VM & P Naphtha | 16.0 |
| 10% by wt. Nevindene resin plus 6% by DBTCE in Shell VM & P Naphtha | 11.5 |

It is apparent from this test that a waxy material coating containing the fungicide DBTCE has a marked effect on control of decay as compared with a coating containing the waxy material without DBTCE.

Results of tests using the solutions prepared and applied in accordance with the foregoing examples indicate that the subject process and coating enable good control of *Penicillium digitatum, Penicillium italicum,* Botrytis, Rhizopus, Diplodia, Phomopsis, Trichoderma, Geotrichum, and Alternaria. The presence of the DBTCE in the coating film enveloping the fruit and vegetables does not significantly affect the appearance, odor or flavor characteristics of the treated produce.

It has been determined that by the process of the present invention, the waxy material is so deposited on the surface of the fruit that not only is the desired control of decay obtained, but also the evaporation of moisture from the fruit is reduced by about 30% to 60% as compared with the moisture that would be lost if the fruit was marketed without the subject coating. Furthermore, the waxy material coating also improves the appearance by imparting to it a desirable gloss.

In summary, therefore, the subject non-aqueous, non-emulsified solution containing the fungicide DBTCE, the waxy carrier for the fungicide, and the non-aqueous volatile organic solvent for the fungicide and carrier has several advantages. When applied to fruit and vegetables, the waxy carrier slowly releases the fungicidal vapor which intimately contacts the surface of the produce, and cuts, punctures, and molds spores therein for protracted periods of time sufficient to provide a practicable market life for the produce. Furthermore, since the solution lacks an emulsifier, barriers are not formed on the mold spores so that the fungicidal vapor is able to come into direct contact therewith. Furthermore, DBTCE is capable of retarding the growth of certain strains of mold which resist the toxic action of other fungicides so that it continues to dependably retard the decay of fruit for periods longer than other fungicides. Also, the vapor from the DBTCE does not soften the waxy carrier and cause stickiness. As a result, more DBTCE (resulting in better fungicidal action) can be employed in the solution than with certain other vaporizable fungicides without developing objectionable stickiness.

Having described the invention what is claimed as new and desired to be secured by Letters Patent is:

1. A process of enabling intimate contact of a fungicide with the surface of fruit and vegetables which it is desired to preserve, said surface including mold spores and their hydrophobic coverings, consisting essentially of applying on said surface a non-aqueous solution consisting essentially of the fungicide 1,2-dibromo-1,1,2,2, tetrachloroethane a waxy carrier for said fungicide, and a non-aqueous volatile organic solvent capable of dissolving said carrier and fungicide, said fungicide and carrier being dissolved in said solvent, the ratio of carrier to fungicide being such as to enable the fungicide to be controllably released from said carrier so as to vaporize around said surface, said fungicide being uninhibited by an emulsifier which, if present, would prevent intimate contact of said fungicide with the hydrophobic covering of the mold spores and would also coat said mold spores thereby forming a barrier against the entrance of the fungicide thereinto, said fungicidal vapor thereby directly contacting said mold spores and their hydrophobic coverings.

2. The process of claim 1 wherein said waxy carrier is present in said solution in an amount from about 1 percent by weight to about 20 percent by weight and wherein said fungicide is present in an amount from about 0.5 percent by weight to about 10 percent by weight.

3. A preservative composition for application to the surface of fruits and vegetables having mold spores consisting essentially of a solution of waxy carrier and the fungicide 1,2-dibromo-1,1,2,2,tetrachloroethane dissolved in non-aqueous solvent capable of dissolving said carrier and fungicide, the ratio of carrier to fungicide being such as to enable the fungicide to be controllably released from said carrier so as to vaporize around and intimately contact said spores, said fungicide being uninhibited by the presence of an emulsifier which, if present, would prevent said intimate contact.

4. The composition of claim 3 wherein said waxy carrier is present in said solution in an amount from about one percent by weight to about twenty percent by weight and wherein said fungicide is present in an amount from about 0.5 percent by weight to about ten percent by weight.

References Cited by the Examiner
UNITED STATES PATENTS

| 1,943,468 | 1/34 | Bridgeman et al. | 99—168 |
| 2,128,973 | 9/38 | Tisdale et al. | 99—168 X |
| 2,213,557 | 9/40 | Tisdale et al. | 99—168 |
| 2,469,914 | 5/49 | Bridgeman | 99—168 |
| 2,710,849 | 6/55 | Siggel | 260—33.6 X |
| 2,853,415 | 9/58 | Smith et al. | |

A. LOUIS MONACELL, *Primary Examiner.*

HYMAN LORD, *Examiner.*